(12) United States Patent
Palmer et al.

(10) Patent No.: US 10,780,910 B2
(45) Date of Patent: Sep. 22, 2020

(54) SELF-ALIGNING DRIVE GEAR

(71) Applicant: NSK Americas, Inc., Ann Arbor, MI (US)

(72) Inventors: Justin R. Palmer, Canton, MI (US); David Ray Hartman, Brighton, MI (US)

(73) Assignee: NSK Americas, Inc., Ann Arbor, MI (US)

( * ) Notice: Subject to any disclaimer, the term of this patent is extended or adjusted under 35 U.S.C. 154(b) by 113 days.

(21) Appl. No.: 16/076,496

(22) PCT Filed: Feb. 10, 2017

(86) PCT No.: PCT/US2017/017443
§ 371 (c)(1),
(2) Date: Aug. 8, 2018

(87) PCT Pub. No.: WO2017/139627
PCT Pub. Date: Aug. 17, 2017

(65) Prior Publication Data
US 2019/0016364 A1      Jan. 17, 2019

Related U.S. Application Data

(60) Provisional application No. 62/294,509, filed on Feb. 12, 2016.

(51) Int. Cl.
*B62D 1/181* (2006.01)
*B62D 1/187* (2006.01)
*F16H 25/24* (2006.01)

(52) U.S. Cl.
CPC ............. *B62D 1/181* (2013.01); *B62D 1/187* (2013.01); *F16H 25/24* (2013.01)

(58) Field of Classification Search
CPC .......... B62D 1/181; B62D 1/187; F16H 25/24
See application file for complete search history.

(56) References Cited

U.S. PATENT DOCUMENTS 6,637,771 B2 * 10/2003 Yoshimoto ............. B62D 1/181
280/775
2008/0156138 A1 * 7/2008 Tomaru .................. B62D 1/181
74/493

(Continued)

FOREIGN PATENT DOCUMENTS

| EP | 1486395 A1 | 12/2004 |
|---|---|---|
| WO | 2015/144527 A1 | 10/2015 |

OTHER PUBLICATIONS

International Search Report and Written Opinion for International Application PCT/US2017/017443 dated Jun. 1, 2017.

*Primary Examiner* — Drew J Brown
(74) *Attorney, Agent, or Firm* — The Dobrusin Law, P.C.

(57) ABSTRACT

The present teachings include a steering column assembly including an outer tube and an inner tube adapted for fore and aft translation relative to the outer tube. The assembly includes an actuator for causing the fore and aft translation. The actuator includes a motor and a screw having a longitudinal axis that is rotationally driven about the longitudinal axis by the motor. The assembly includes a pivoting nut assembly adapted to travel fore and aft generally along an axis that is the same as or generally parallel with the longitudinal axis. The pivoting nut assembly includes a bracket that is operably Joined with the inner or outer tube, for causing fore or aft translation of the inner tube in response to operation of the motor, and a nut that is assembled on the bracket and is adapted for pivotal movement in an axis generally transverse to the longitudinal axis.

20 Claims, 6 Drawing Sheets

(56) References Cited

U.S. PATENT DOCUMENTS

2010/0320352 A1* 12/2010 Weber .................... B60N 2/067
   248/429
2018/0273080 A1*  9/2018 Martinez ................ B62D 1/181
2018/0304777 A1* 10/2018 Ito .......................... B60N 2/067
2019/0202495 A1*  7/2019 Rouleau ................. B62D 1/181

* cited by examiner

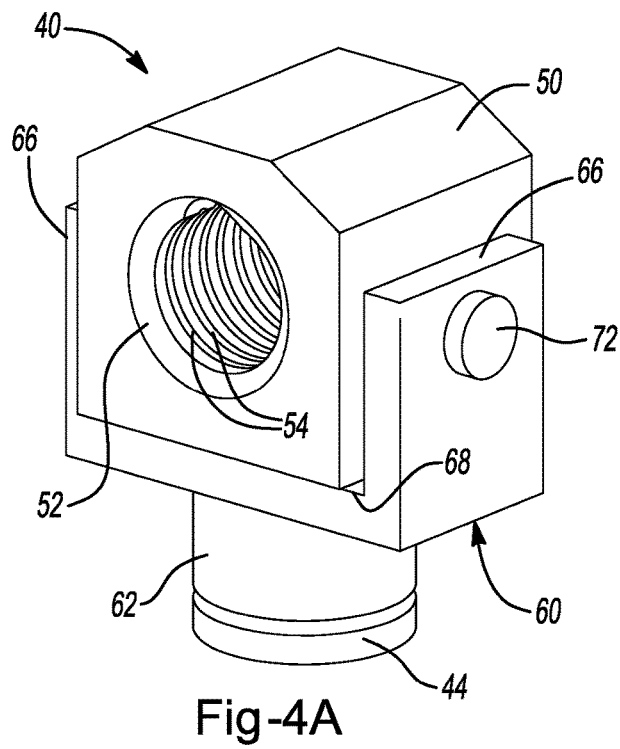 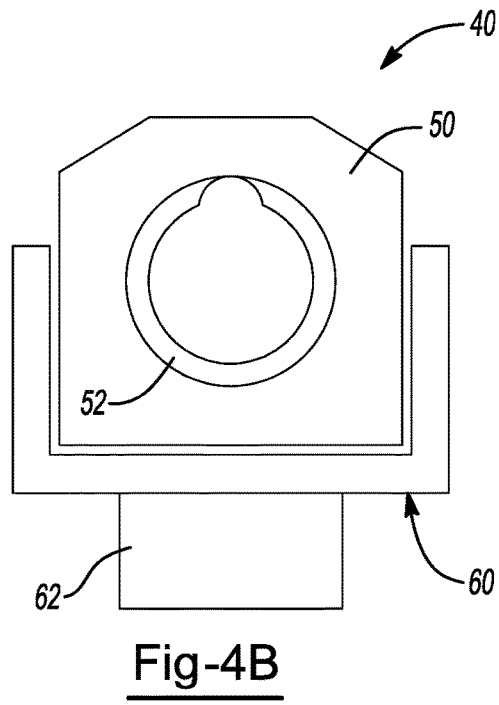
Fig-4A
Fig-4B
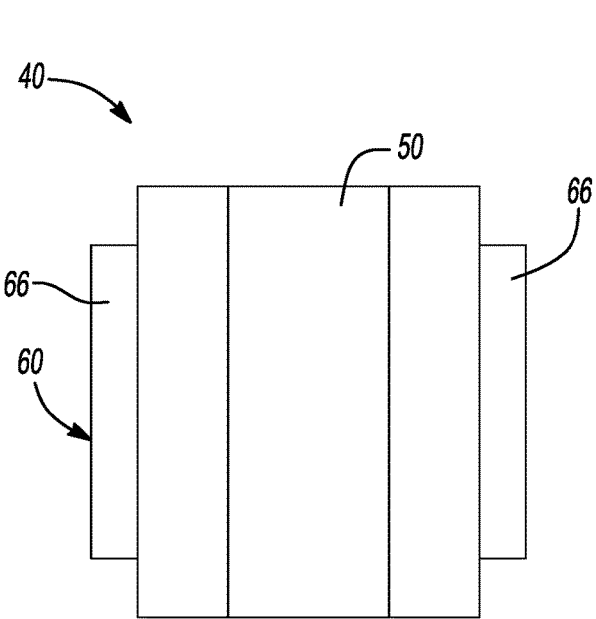 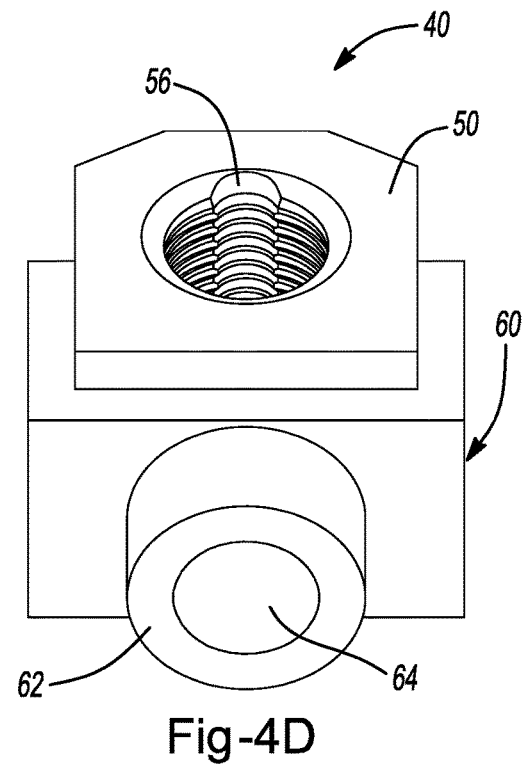
Fig-4C
Fig-4D

SELF-ALIGNING DRIVE GEAR

FIELD

In general, the present teachings relate to an improved telescoping function within a steering column assembly. More particularly, the present teachings pertain to a self-aligning drive gear that allows for improved telescoping.

BACKGROUND

In the field of automotive vehicles, it has become popular to employ steering column assemblies that include tilt and/or telescoping functions, such assemblies being known also as "rake and reach steering column assemblies." For assemblies that have an adjustable tilt or rake function, it is common to use a motor, and particularly an electric motor. For example, it is common to employ an electric motor that rotates a screw on which a translatable nut is driven for actuating a steering column assembly. Such an assembly can be used to raise or lower a portion of the steering column assembly (e.g., to thereby allow adjustment of the steering wheel) or cause telescoping for fore and aft translation of a portion of the steering column assembly (e.g., to thereby allow adjustment of the steering wheel).

Due to design constraints and available space for housing components, it is often necessary to apply a driving force (e.g., via a motor and screw) that is offset relative to a structure that it is intended to drive. A translatable nut may connect the screw driven by the motor and the structure that it is intended to drive. As a result of the offset and resistive forces of a driven structure, there Is a potential for a bending moment to arise. The bending moment, in turn, can cause the nut to rock, can cause threads of the nut and screw to become misaligned, and can potentially lead to premature wear. Accordingly, there is a need for an improved structure.

Notwithstanding efforts to improve steering column assemblies (e.g., steering column assemblies having adjustable telescoping functions), there remains a need for alternative assemblies, particularly those that extend the life of the telescoping subassembly, that provide a smoother telescoping function, or both.

SUMMARY

The present teachings make use of a simple, yet elegant, construction approach by which relatively few components can be employed for achieving an adjustable steering column assembly, such as a steering column assembly able to effectively perform an adjustment of the steering column by having a telescoping function (and/or a tilt function).

The teachings generally contemplate a steering column assembly that includes an inner tube (e.g., a column tube) and an outer tube (e.g., a column housing). The inner tube (e.g., column tube) may be configured to be carried by the outer tube (e.g., column housing) (e.g., in a telescoping manner), in one or more fixed positions. For example, the inner tube (e.g., column tube) may be telescopically adjustable (e.g., by way of a motor) within and/or relative to the outer tube (e.g., column housing). The outer tube and inner tube (e.g., column housing and the column tube, respectively) each will have a longitudinal axis. Their respective longitudinal axes may be generally aligned (e.g., they may be generally co-axial). The outer tube may have an inner diameter. The inner tube may have an outer diameter that is smaller than the inner diameter of the outer tube. The inner tube may be received within the outer tube, and the inner tube may be adapted for fore and aft translation relative to the outer tube. The inner tube may be adapted to support a steering shaft (adapted for coupling with a steering wheel or other like structure). The outer tube may be a column housing, such as a cast metal column housing. The inner tube, the outer tube, or both, may include a telescoping bolt projecting outwardly (e.g., radially) from its external surface. The telescoping bolt may be in mating relation with a pivoting nut assembly of the steering column assembly.

The steering column assembly may also include a telescoping subassembly adapted to selectively advance the inner tube (e.g., column tube), steering shaft, outer tube (e.g., column housing), or a combination thereof, in a fore or aft direction. The steering column assembly (e.g., the telescoping subassembly) may include an actuator, including at least one motor adapted for translating at least a portion of the steering column assembly (e.g., the inner tube) in a fore and/or aft direction. The motor may be mounted in a fixed position relative to one of the inner tube our outer tube. The motor may be configured to operatively rotate a telescoping screw about its longitudinal axis and cause a pivoting nut assembly to travel along the telescoping screw. When the nut of the pivoting nut assembly moves along the telescoping screw (e.g., due to rotation of the telescope screw), the position of the nut may cause the inner tube (e.g., column tube) to translate (e.g., in a fore or aft direction) relative to the outer tube (e.g., column housing). While discussions herein reference a telescoping screw and telescoping subassembly, it is contemplated that the pivoting nut assembly of the present teachings may also be used within a tilt subassembly and situated on or associated with a tilt screw. Accordingly, use for either a tilt subassembly or telescoping subassembly is within the scope of these teachings.

The pivoting nut assembly may include any of the features as disclosed herein in any combination. The pivoting nut assembly may include a bracket that is operably joined with the inner tube or the outer tube (e.g., the tube that is not fixed relative to the motor) for causing fore or aft translation of the inner tube in response to operation of the motor. The pivoting nut assembly may also include a nut that is assembled on the bracket. The nut may be adapted for pivotal movement (e.g., generally transverse to the longitudinal axis of the screw). This pivotal movement may be relative to the bracket, the telescoping screw, or both. The telescoping bolt extending from the inner tube, the outer tube, or both, may be adapted for a mating relationship with the bracket of the pivoting nut assembly. The mating relationship between the bracket and the telescoping bolt may allow the bracket to translate about an axis located in a plane that is generally transverse (+/− about 30 degrees of the plane) to the longitudinal axis of the screw, of the outer tube, of the inner tube, or a combination thereof; rotate about an axis located in a plane that is generally transverse (+/− about 30 degrees of the plane to the longitudinal axis, or both. The bracket may include a base having a bore defined therein for matingly receiving the telescoping bolt projecting outwardly (e.g., radially) from the inner tube, the outer tube or both. The bracket may be free of any permanent attachment to the inner tube, outer tube, or both (e.g., may be free of any weld attachment). The bracket may be fixed to the inner tube, outer tube, or both by the telescoping bolt and/or another fastener. The bracket may be a plate stop. The plate stop may be secured to the inner tube, outer tube, or another part of the steering column assembly. The bracket may include at least one wall projecting outward from the base. The at least one wall may be configured to pivotally support the nut of the pivoting nut assembly. The at least one wall projecting outward may be a first wall and is part of a configuration having another spaced apart second wall that generally opposes the first wall. The pivoting nut assembly may include a nut. The nut may be configured to have one or more lateral projections that pivotally engage the at least one wall projecting outward. The nut may be configured to have one or more wells adapted to pivotally receive a projecting member from the at least one wall projecting outward. The pivotal connection between the nut and the bracket may be achieved by a male portion that at least partially penetrates a female portion. The male portion may be an outward projection (e.g., a pin, a boss, a post, or the like). The pivotal connection between the nut and bracket may be achieved by a separate fastener (e.g., a pin) being inserted into openings in both the nut and bracket. The nut and the bracket may be assembled together in pivotal relation to impart a clearance (e.g., about 3 mm or less, about 2 mm or less, or about 1 mm or less) between opposing surfaces of the bracket and the nut for affording the nut a degree of pivotal rotation when carried by the bracket. The nut and the bracket may be in generally fixed relation with each other (e.g., less than about 3 mm) in a radial direction relative to the tube to which it is secured. Radial movement, for example, could be accomplished solely through the bracket. The pivoting nut assembly may be free of a press fit between the bracket and the nut. As there is a presence of a gap or clearance between the bracket and the nut to allow for the pivoting relationship, a press fit may, in some cases, be unnecessary or undesirable. It is possible that the pivoting nut assembly may consist of no more than 4 separately formed components, it is possible that the pivoting nut assembly consists of no more than 2 separately formed components.

It is contemplated that the nut (e.g., an opening in the nut) may be threaded to threadingly co-act with the screw. The nut may optionally include a suitable receptacle to hold a lubricant for lubricating surfaces between the nut and the screw. During operation of the steering column assembly for causing a fore or aft translation of the inner tube, the screw may exert a first force generally along the longitudinal axis. The bracket may exert a second force generally opposite the first force. The inner tube may exert a third force in a direction generally opposite the direction of the first force in a spaced generally parallel relationship. The first force and the sum of the second force and third force may be an amount that is earned by the bracket generally to the exclusion of the nut.

The present teachings further include a method of translating a steering shaft of a steering column assembly (e.g., the steering column assembly as described herein) in a fore or aft direction by advancing a tube that supportingly carries the steering shaft. The method may include causing a screw to rotate and generate a force in a first direction. The first direction may be generally parallel to a longitudinal axis of the steering shaft. The rotation and generation of force may cause a nut linked with the tube that supportingly carries the steering shaft to advance substantially in the first direction. The method may include inducing a pivotal motion and/or a radially outward motion in the pivoting nut assembly that creates a force state that allows the nut to retain a substantially constant orientation throughout fore and aft translation.

As can be seen, it is thus possible to realize a unique assembly (and associated methods) that enables an adjustment function (e.g., a telescope function, a tilt function, or both) within the steering column assembly that reduces rocking of a nut of a telescoping subassembly on a screw, that maintains proper thread engagement between the screw and nut, that reduces premature and abnormal wear on the nut, that extends the life of at least a portion of the telescoping subassembly, or a combination thereof.

BRIEF DESCRIPTION OF THE DRAWINGS

FIGS. 4A, 4B, 4C, and 4D are various views of a pivoting nut assembly in accordance with the present teachings.

DETAILED DESCRIPTION

Figure 1:
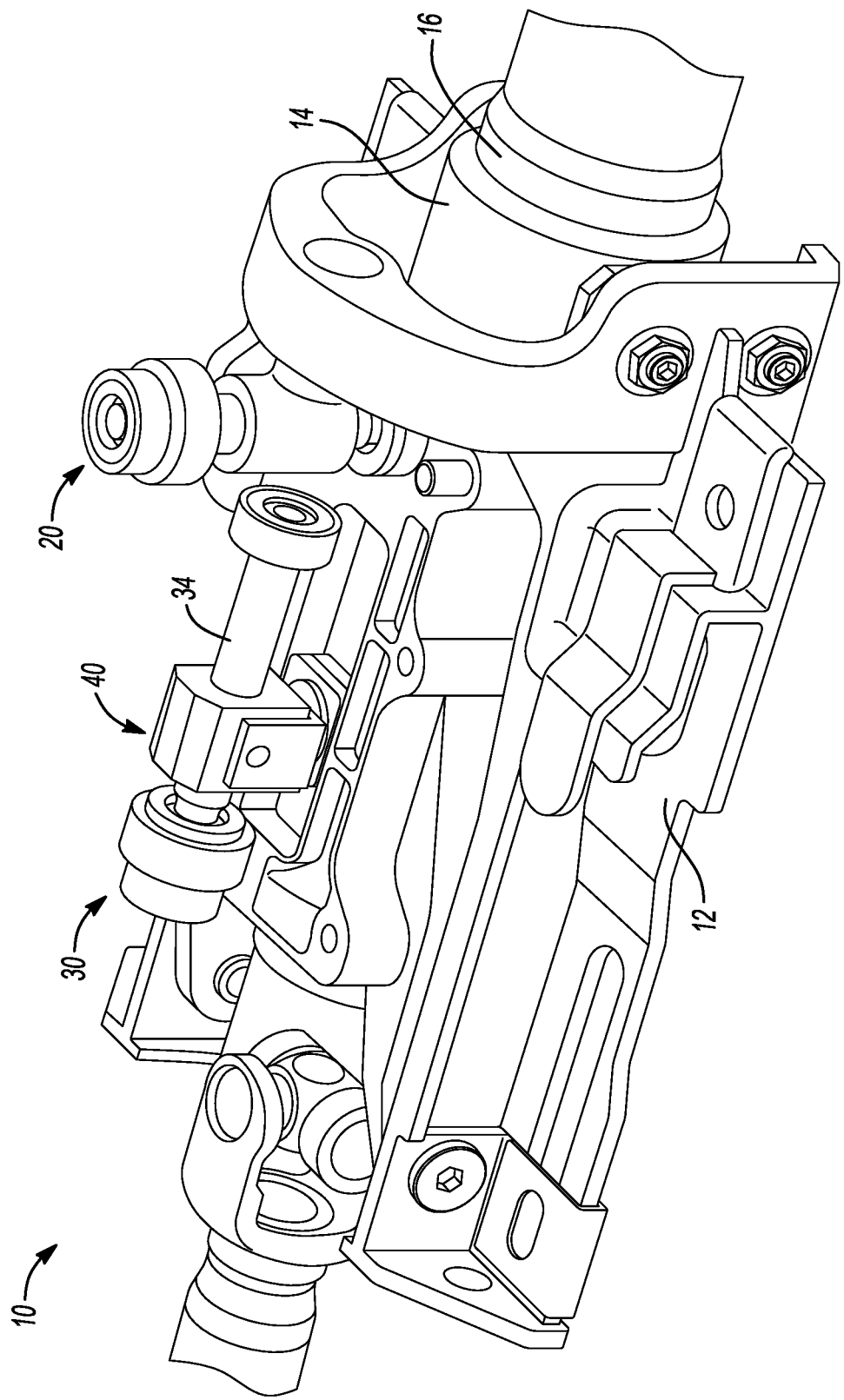
FIG. 1 is a perspective view of a steering column assembly.

As required, detailed embodiments of the present teachings are disclosed herein; however, it is to be understood that the disclosed embodiments are merely exemplary of the teachings that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present teachings.

In a very general sense, the teachings herein relate to an improved assembly by which adjustment is possible (e.g., telescoping adjustment, tilt adjustment, or both). The teachings relate to a steering column assembly that includes a self-aligning pivoting nut assembly that assists in translation of an inner tube relative to an outer tube of the steering column assembly.

In general, and as will be appreciated from the description that follows, the present teachings pertain to a steering column assembly, and more particularly, an adjustable steering column assembly (e.g., having tilt and/or telescoping functions). The steering column assembly may include a mounting portion, such as a steering column mounting structure having an upper portion adapted to be fixedly secured within an automotive vehicle, for securing the steering column assembly in a vehicle in a fixed operational position. As will be also seen, the teachings envision that the steering column assembly may include a reach adjustment that is adapted to allow a user to select an appropriate fore-aft position of the steering wheel, a tilt or rake adjustment that is adapted to allow a user to select an angle of Inclination of a steering wheel, or both. In general, any such adjustment may be controlled by a motor or a suitable user operating device (e.g., a lever, an electromechanical actuator, or otherwise).

The teachings describe aspects useful for an adjustable steering column assembly for an automotive vehicle (e.g., an adjustable rake and/or reach steering column assembly). In general, an assembly of the teachings herein may include a steering shaft (e.g., one that can be coupled with a steering wheel or other steering device) and/or one or more tubes that are adapted to support the steering shaft (e.g., via one or more bearings). The steering column assembly may include an outer tube having an inner diameter. The steering column assembly may include an inner tube having an outer diameter. The inner tube may have an outer diameter that is smaller than the inner diameter of the outer tube. The inner tube may be received or at least partially located within the outer tube. The outer tube may be a column housing (e.g., a cast metal column housing). The column housing may be adapted to be mounted (e.g., pivotally) within an automotive vehicle structure. The outer tube (e.g., a column housing) may be adapted to telescopically couple with the inner tube (e.g., a column tube). The inner tube may be adapted for fore and aft translation relative to the outer tube. The inner tube and outer tube may each have a longitudinal axis that is generally parallel or even coaxial with each other. A mounting bracket, such as a steering column mounting structure, may be employed for at least partially securing either or both of the inner tube (e.g., column tube) or the outer tube (e.g., column housing) to the vehicle (e.g., to a cross-vehicle structure).

The steering column assembly may include a telescoping subassembly that permits adjustment of the position of the steering wheel (or other steering device) in a fore and/or aft position relative to the user or vehicle operator, relative to the column housing, or both. The telescoping subassembly may include a motor, which may cause rotation of a telescope screw within the assembly. The telescope screw may have a threaded shank portion that engages with a nut (e.g., of a pivoting nut assembly). The nut may move along the telescope screw (e.g., fore or aft), as a result of the engagement between the motor and the telescope screw. The nut may be matingly engaged with an element attached to the inner tube (e.g., column tube), outer tube (e.g., column housing), or both, so that when the nut moves along the screw, the inner tube, outer tube, or both, also telescopically move in the same direction as the nut. As the telescope nut moves, the inner tube, the steering shaft, or both may telescope inwardly or outwardly (e.g., fore and/or aft) relative to the user, the outer tube (e.g., column housing), or both, which may assist in the telescope adjustment of the steering column assembly (e.g., the steering wheel). The steering column assembly may include a tilt subassembly that permits angular adjustment of the tilt of the steering wheel (or other steering device) relative to the user or vehicle operator. The tilt subassembly may include a motor (e.g., a tilt motor or motor that controls both tilt and telescoping adjustment). The motor may cause rotation of a tilt screw within the assembly.

With more attention now to the details of the adjustable steering column assembly (e.g., rake, reach, or both) herein, they generally will include a tube that is operatively connected with a steering wheel (not shown), e.g., via a steering shaft. One such tube, referred to herein as an inner tube (e.g., column tube), typically will have a hollow cavity along at least a portion of (if not the entirety of) the length of the tube and may be sized and configured to receive and support a rotatable shaft, namely a steering shaft and possibly one or more bearings. Both the shaft and the tube will have a longitudinal axis. When installed in a vehicle, the longitudinal axis of each the shaft and the tube (as well as the steering column assembly in general) may be generally coaxially aligned, aligned generally parallel with a longitudinal axis of a vehicle, or each. The shaft and the inner tube typically may be made of or otherwise include a suitable metal, such as one or more of iron (e.g., steel), magnesium, zinc, or aluminum.

The inner tube (e.g., column tube) may be generally cylindrical. The inner tube may be generally, or at least partially, hollow, it may have a forward end portion and a rearward end portion, and a longitudinal axis. Either or both of the forward or rearward end portion may include a suitable bearing that supports the steering shaft for rotation.

The steering shaft may have a rearward end portion adapted to receive a steering wheel (not shown). It may have a forward end portion that penetrates through and may be supported by a bearing, a key lock collar, or both. As noted, the steering shaft may be supported for rotation at least in part by the column tube. The steering shaft may also have a longitudinal axis that may be generally coaxially aligned with the longitudinal axis of the column tube.

The adjustable steering column assembly may include one or more mounting brackets or steering column mounting structures that may be employed for receiving at least a portion of the steering shaft. The one or more mounting brackets or steering column mounting assemblies may secure the steering column assembly (e.g., an adjustable rake and/or reach steering column assembly) within the automotive vehicle. By way of example, a steering column mounting structure may include an upper portion that is adapted to be fixedly secured within an automotive vehicle, such as to a vehicle structure, such as a cross vehicle beam, instrument panel, or otherwise. The steering column mounting structure may include one or more downwardly disposed side walls extending from the upper portion of the mounting structure (e.g., forming a collar portion, an area for a pivotal connection with the outer tube (e.g., column housing), or each). The steering column mounting structure may include a single unitary structure or a plurality of components assembled together in an assembly to define the steering column mounting structure. The steering column mounting structure may be a cast structure (e.g., a structure made by casting a mass), a forged structure (e.g., a structure made by forging a metal mass), a machined structure, a consolidated structure (e.g., a structure made by a step of sintering and/or pressing a powder metal mass), or any combination thereof. One approach is to cast the steering column mounting structure to form an aluminum alloy casting. The steering column mounting structure may be configured for integrating functions of mounting within a vehicle and accommodating a tilt function of the assembly relative to a vehicle operator. The steering column mounting structure may include a housing structure, a flange structure, or both for receiving at least a portion of a tilt subassembly (e.g., one that is motorized), at least a portion of a telescoping subassembly (e.g., one that is motorized), or both.

The steering column mounting structure may include a plurality of ribs. The steering column mounting structure may include one or more openings through which a fastener may be passed for attaching the mounting structure to the vehicle. The mounting structure may include an upper portion, at least part of which is adapted to abut against the automotive vehicle structure to which it is attached. For example, for attaching to a generally flat cross-vehicle beam, instrument panel, or both, which is to be disposed above the mounting structure, the mounting structure may include a generally planar upper portion. The upper portion may have a longitudinal axis that extends along the length of the upper portion (e.g., spanning from the forward portion of the steering column mounting structure to the rearward portion of the steering column mounting structure). The upper portion may include one or more mounting apertures for mounting the mounting structure to the automotive vehicle via one or more fasteners. The upper portion may include one or more openings defined therein for accessing elements of the steering column assembly, such as a tilt screw.

The steering column mounting structure may have one or more elements extending therefrom, such as one or more pairs of generally opposing downwardly disposed side walls (e.g., located toward a forward end of the steering column mounting structure, toward a rearward end, toward the center, or combination thereof). The downwardly disposed side walls may be integrally formed with the upper portion (e.g., so that the steering column mounting structure is formed from a single piece). One or more of the downwardly disposed side walls may be a discrete element from the upper portion and may be separately attached to the upper portion. Any, some, or all of the downwardly disposed side walls may project outward and/or downward relative to the upper portion (e.g., they may be generally orthogonally or obliquely disposed relative to the upper portion).

The steering column mounting structure may include a pair of downwardly disposed connecting walls, which provide an area of connection to another element of the steering column assembly (e.g., a column housing). The walls may be disposed toward a forward portion of the mounting structure. The connecting walls may include one or more openings for receiving a fastener that penetrates through the wall and into a portion of the column housing (e.g., a pivot mounting location) to create a pivotal connection. One or more connecting walls may include a portion that extends beyond a forward end of the upper portion of the steering column mounting structure.

The steering column mounting structure may be a structure including one or more downwardly disposed side walls, which may be joined together to form a collar portion. The downwardly disposed side walls (e.g., forming the collar portion) may at least partially flank at least a portion of the steering column assembly (e.g., the steering shaft, the inner tube (e.g., column tube), the outer tube (e.g., column housing), or combination thereof). For example, the mounting structure may include a collar portion that projects away from a lower surface of the upper portion. The collar portion may be defined to include a completely closed or at least partially enclosed structure against which the inner tube may abut. One or more of the downwardly disposed side walls (e.g., forming the collar portion) may be located at or toward a rearward end of the steering column mounting structure. The collar portion may have an asymmetric structure, such as that depicted herein as resembling a capital letter "D," within which one or more components (e.g., a drive member such as a rod) of a motorized tilt subassembly are received. The steering column mounting structure may have a generally "U" shaped wall or collar portion (e.g., where the free ends of the U contact or are connected to the upper portion).

The adjustable steering column assembly may include an outer tube (e.g., a column housing) adapted to carry the inner tube (e.g., column tube) having a steering shaft therein. The outer tube (e.g., column housing) may be generally elongated. It may have a generally cylindrical configuration and/or may be at least partially hollow to receive at least a portion of the steering shaft, the inner tube (e.g., column tube), or both. The outer tube may have an inner diameter that is larger than the outer diameter of the inner tube so that the inner tube can be at least partially received (e.g., telescopically) within the outer tube. The inner may be adapted for fore and aft translation relative to the outer tube. The outer tube (e.g., column housing) may have a longitudinal axis. The longitudinal axis may be generally parallel to or coaxial with the longitudinal axes of the steering shaft, the column tube, or both. At least a portion of the outer tube (e.g., column housing) may be fixed in position for affording a generally upward and downward pivotal motion in relation to the steering column mounting structure. As indicated, an outer tube (e.g., column housing) may be pivotally coupled with the steering column mounting structure (e.g., at a forward end of both the mounting structure and the column housing), for example, at one or more of the downwardly disposed side walls, such as the connecting walls located at the forward portion of the mounting portion. The pivot mounting location may be at or within about 20, 30, 40 or 50 mm of a forward end of the outer tube (e.g., column housing). The pivot mounting location may be on an underside of the outer tube (e.g., column housing), on a top side of the outer tube (e.g., column housing), or at some location in between the top side and the underside of the column housing. For example, the outer lube (e.g., column housing) may have a lower portion that has laterally projecting flanges over at least a portion of the column housing length. The flanges may project from both sides of the outer tube (e.g., column housing). The flanges may project laterally outward to a location that extends beyond the outermost reach of the wall from which it projects. The coupling between the mounting structure and the outer tube (e.g., column housing) may be adapted to permit steering shaft adjustment (e.g., tilt adjustment, telescoping adjustment, or both, such as by way of the tilt subassembly, the telescoping subassembly or both).

The outer tube may be a column housing. The column housing may be a cast structure (e.g., a structure made by casting a mass), a forged structure (e.g., a structure made by forging a metal mass), a machined structure (e.g., a structure by forging a metal mass), a machined structure, a consolidated structure (e.g., a structure made by a step of sintering and/or pressing a powder metal mass), or any combination thereof. A cast structure (e.g., including a metal such as aluminum, magnesium, zinc, and/or iron (e.g., steel)), for example, may be an aluminum alloy casting. The column housing may include one or more ribs.

The steering column assembly may include a telescoping subassembly for allowing at feast a portion of the steering column assembly (e.g., steering wheel, steering shaft, inner tube, or combination thereof) to be adjusted in a fore and/or aft position in relation to a user, in relation to the outer tube (e.g., the column housing), or both. The telescoping subassembly may include an actuator for causing the fore and aft translation of elements within the steering column assembly (e.g., steering wheel, steering shaft, inner tube, or combination thereof). The actuator may include a motor. The motor may be in a fixed position within the steering column assembly. The motor may be mounted in a fixed position relative to one of the outer tube or the inner tube. The actuator may include a screw (e.g., a telescope screw) having a longitudinal axis. The screw may be rotationally driven about the longitudinal axis by the motor. The screw may be a threaded screw to allow for engagement with a pivoting nut assembly (e.g., a nut of the pivoting nut assembly).

The telescoping of elements of the steering column assembly may be performed, at least in part, by joining the screw of the actuator with the element of the steering column to be telescopically adjusted. For example, a self-aligning member may connect the screw and another portion of the steering column assembly, such as the inner tube. The screw and the inner tube (and/or their longitudinal axes) may be spaced apart but generally parallel within the steering column assembly. The self-aligning member may be a pivoting nut assembly. The pivoting nut assembly may be adapted to travel fore and aft along the length of the screw of the actuator. The pivoting nut assembly may function to convert to the rotational motion of the screw into linear motion, as the pivoting nut assembly moves fore and/or aft along the length of the screw as the screw is rotated. The pivoting nut assembly may act to join the screw and the element of the steering column assembly to be translated (e.g., the inner tube). For example, this joining may be performed by an element that engages with the screw (e.g., a nut) and an element that is in mating relation with the inner tube of the steering column assembly or a projection extending therefrom (e.g., a bracket in mating relation with a telescoping bolt radially extending from the inner tube). The pivoting nut assembly may consist of relatively few components. For example, the pivoting nut assembly may consist of no more than four separately formed components. The pivoting nut assembly may consist of no more than two separately formed components.

The pivoting nut assembly may include a nut that engages with the telescope screw. The nut may include an opening (e.g., that extends through the nut) for receiving the telescope screw. The opening may be threaded to engage with the threads of the screw of the actuator. As the screw rotates, the nut may travel along the screw and along an axis that is the same as or generally parallel with the longitudinal axis of the screw. The nut may include a receptacle within the opening for containing or holding a lubricant for lubricating surfaces between the nut and the screw. The nut may be any shape that is capable of receiving the screw. The nut may be any shape that is capable of being received between walls of a bracket. For example, the nut may have a generally circular cross section, a generally rectangular cross section, a polygonal cross section, a cross-section having one or more generally straight segments, a cross-section having one or more curves, or a combination thereof.

The pivoting nut assembly may include a bracket that is operatively joined with the inner tube or the outer tube (e.g., the tube that is not fixed relative to the motor). For example, the bracket may serve to connect the nut and the inner tube. The bracket may include a base for attaching to or engaging with a portion of the inner tube, outer tube, or both. The bracket may include at least one waif projecting outwardly from the inner column tube, toward the screw of the actuator, or both. The bracket may include at least one wall projecting outward from the base (e.g., away from the inner tube, toward the screw of the actuator, or both). The at least one wall may be configured to pivotally support the nut of the pivoting nut assembly. For example, the bracket may include two walls projecting outwardly from the base, where there is a first wall and another spaced apart second wall that generally opposes the first wall. The nut may be received and supported between these generally opposing walls. The nut may be permitted to rotate, pivot, translate (e.g., transverse to the longitudinal axis of the screw), and/or otherwise move within the generally opposing walls or relative to the generally opposing walls.

The inner tube, outer tube, or both, may include a telescoping bolt projecting outwardly (e.g., radially) from its external surface. For example, the inner tube may include the telescoping bolt projecting outwardly from its external surface. The telescoping bolt may be adapted for a mating relationship with the bracket of the pivoting nut assembly. The base of the bracket may include a bore defined therein for matingly receiving the telescoping bolt. The mating relationship between the bracket (e.g., the base) and the telescoping bolt may allow the bracket to move vertically, move side-to-side, tilt, and/or rotate relative to the telescoping bolt. The bracket may have a transition fit to the bolt. The transition fit may allow the bracket to rotate up to 360 degrees about the bolt and move freely up and down on the bolt. The movement may keep the nut from being overly constrained. The mating relationship between the bracket and the telescoping bolt may allow the bracket to translate about an axis located in a plane that is generally transverse (e.g., +/− about 30 degrees of the plane) to the longitudinal axis of the screw. The mating relationship may allow the bracket to rotate about an axis located in a plane that is generally transverse (e.g., +/− about 30 degrees of the plane) to the longitudinal axis of the screw. The bracket may be free of any permanent attachment to the inner tube, the outer tube, or both (e.g., free of any weld attachment).

It is possible that the pivoting nut assembly can still maintain proper position of the nut on the screw without the base being able to move, tilt or rotate. The base may include an opening or a bore defined therein for receiving a fastener to attach the bracket to the inner tube, outer tube or both. Therefore, the bracket may be fixed to the inner tube, outer tube, or both to prevent rotation or translation of the bracket along an axis located in a plane that is generally transverse to the longitudinal axis. The base may be otherwise secured to the inner tube, outer tube, or both. For example, the base may be adhered, welded, riveted, brazed, or the like, to the inner tube (or the tube that is adapted for fore and aft translation).

The nut may be assembled on and/or supported by the bracket. The nut and bracket may be adapted for pivotal movement relative to each other. The nut any bracket may be adapted for other movement relative to each other (e.g., the nut may be able to translate toward and away from the base of the bracket). The nut may be adapted for pivotal movement in an axis generally transverse to the longitudinal axis of the screw. A clearance between the nut and the bracket may allow for the nut and bracket to pivot relative to each other (i.e., affording the nut a degree of pivotal rotation when carried by the bracket). The clearance may be about 3 mm or less, about 2 mm or less, or about 1 mm or less. The bracket and nut may be joined in one or more locations, creating one or more pivot points. The location of the pivot point between the nut and the bracket may be aligned with the center line of the screw (i.e., at the longitudinal axis of the screw extending through the center of the screw). For example, the bracket and nut may be joined in two locations (i.e., on generally opposing walls extending from the base of the bracket). A plane extending between these opposing interfaces or joints between the nut and the bracket may be generally orthogonal to the center line of the screw (but pass through the center line of the screw), which may allow the nut to rotate or move to any degree equal and opposite to that of the bracket to maintain proper thread alignment between the nut and the screw.

The nut and the bracket may be pivotally secured to each other in any of a number of different ways. The pivotal relation may allow the bracket, nut, or both to be free to rotate so that the nut can pivot to offset any movement of the bracket during translation. The pivotal connection between the nut and the bracket may be achieved by a male portion that at least partially penetrates a female portion. The male portion may be an outward projection, such as a pin, a boss, or a post. The male portion may be on either the nut or the bracket. The female portion may be a channel, a well, an opening, an indent, or the like. The female portion may be on either the nut or bracket. The nut of the pivoting nut assembly may be configured to have one or more lateral projections that pivotally engage the at least one wall of the bracket. For example, a boss feature may be extruded from the nut and seated into a channel or hole in the bracket. In another example, the nut may have one or more wells adapted to receive a projecting member from the at least one wall of the bracket (e.g., rotationally receive or translatably receive). A boss feature may be stamped or otherwise formed on or extending from the bracket and seated into a channel, well, or hole in the nut. The wall Itself may engage with the one or more wells of the nut. To maintain the ability to pivot, the wall may have a generally rounded top portion for the nut to rotate on. Both the nut and the bracket may include corresponding openings for receiving a fastener, such as a pin or a screw. The pin or other fastener may be an added structure or an integrated structure. The pivoting nut assembly may be free of a press fit between the bracket and the nut. Due to the clearance between the nut and the bracket, a press fit may be unnecessary or may not allow for sufficient rotation of the nut and/or bracket.

The pivoting nut assembly may Include a bushing that directly contacts the wall of the bracket (or plate stop), directly contacts the nut, or both. The bushing may be adapted to be secured on the wall of the bracket and may be permitted to rotate or pivot on the wall. For example, the wait may have a curved surface upon which the bushing rests. The bushing may have a curvature that matches the curvature of the wall so that the bushing may slide along the curved surface of the wall. The bushing may serve to eliminate or reduce the line contact between the nut and the bracket but still allow translational and/or rotational movement between the nut and the bracket (or plate stop). The bushing may be received within a portion of the nut (e.g., within a channel, well, or hole in the nut) so that the nut may translate along the bushing (e.g., toward and away from the base of the bracket, toward and away from the inner tube, toward and away from the outer tube, or a combination thereof). As the bushing may be permitted to rotate or pivot about the wall of the bracket, this permits movement of the pivoting nut assembly both translationally and rotationally.

During operation of the telescoping subassembly, forces are exerted upon the nut, bracket, or other parts of the steering column assembly. There is an acting force by the screw along its longitudinal axis. There is a resisting force from the inner tube (e.g., column tube) and telescope bolt extending therefrom, in generally the opposite direction as the acting force by the screw, which must be overcome for the nut to advance along the screw. As the screw is in a spaced apart relation with the inner tube and the telescope bolt projecting therefrom, there is an offset in these forces, which creates a bending moment.

The pivoting nut assembly may function to reduce or eliminate a bending moment and rocking of a nut caused by acting and resisting forces on the nut. In conventional non-pivoting nut designs, which may be a single piece non-pivoting nut that joins the telescoping screw and the element adapted for translation (e.g., the inner tube), a bending moment is translated through the nut, which causes the nut to rock on the screw. This rocking creates a misalignment between the threads of the screw and the threads of the nut, which may cause the nut to wear, or may require the motor of the telescope subassembly to have a high operating current.

The pivoting nut assembly may allow the screw and nut thread to self-align. In order to self-align, the nut may be free from constraints and external forces in all directions, except for the acting force of the screw (e.g., along its longitudinal axis). By employing a pivoting nut assembly, where the nut and the bracket are in pivoting relation with each other, the bending moment on the nut can be reduced or eliminated. With the bracket serving to join the nut (in a pivotal relation) and the inner tube (or element of the steering column assembly to be translated), the bending moment is contained within the bracket. The bracket may be permitted to rock or move (e.g., rotate or translate about an axis located in a plane that is generally transverse (+/− about 30 degrees of the plane) to the longitudinal axis of the screw). This rocking or movement of the bracket, due to the pivoting relationship between the nut and the bracket, may not be transferred to the nut, thereby allowing the nut to retain proper thread alignment with the screw. Therefore, during operation of the steering column assembly for causing a fore or aft translation of the inner tube, the screw may exert a first force generally along the longitudinal axis. The bracket may exert a second force generally opposite the first force. The inner tube may exert a third force in a direction generally opposite the direction of the first force in a spaced generally parallel relationship. At least some of the forces may be carried only by the bracket, with little to no force being carried by the nut (e.g., except the force by the screw to advance the nut along the length of the screw in either direction). The first force and the sum of the second force and third force may be an amount that is carried by the bracket generally to the exclusion of the nut. The nut may be able to pivot at the interface between the bracket and the nut positioned generally at the centerline of the screw, thereby permitting proper thread engagement between the screw and the nut. By maintaining proper thread engagement, it is possible to reduce or eliminate premature and/or abnormal wear of the nut. It is possible to also extend the life cycle of the nut (and/or other elements of the telescoping subassembly), reduce the amount of operating current required by the motor for rotating the screw, or both.

A pivoting nut assembly, as discussed herein, may serve to extend the performance life of the telescoping subassembly, or components thereof, such as the screw, nut and/or bracket. The pivoting nut assembly may function to reduce the operating current required for the motor. The reduction in operating current required may allow for less expensive motors to be used within the steering column assembly (e.g., the telescoping subassembly). For example, use of the pivoting nut assembly may result in at least a 10× increase in cycle life as compared with a conventional non-pivoting nut design. The increase in cycle life may even be about 15× or greater, about 20× or greater, about 25× or greater, or even about 30× or greater. By providing smoother travel and reducing the bending moment on the nut through the use of a pivoting nut assembly, the required current may be reduced by about 20% or more, about 30% or more, or even about 40% or more.

These benefits may be realized and quantified through testing a steering column assembly including a conventional non-pivoting nut and a steering column assembly including a pivoting nut assembly as described herein. The testing may be performed through performing telescopic operation with torque. For example, as the inner tube telescopes, it moves within the outer tube (e.g., column housing). On the opposing end of the steering column assembly (e.g., toward the forward end of the assembly), a spline tube moves over a spline shaft. The spline shaft is mounted to a fixture that is free to rotate. A weight is attached to the spline shaft and inputs a torque to the shaft (e.g., a torque of about 20 Nm). With the spline shaft torqued, the spline tube is prevented from rotating by locking the inner tube to the steering shaft. The inner tube is prevented from rotating by the telescope bolt (i.e., the bolt to which the conventional non-pivoting nut or the pivoting nut assembly is in mating engagement). Testing may be performed by causing fore and aft translation (i.e., telescoping) at a telescope stroke of 30 mm. The telescopic cycles may be performed until failure, where failure is defined as abnormal telescopic operation (e.g., seizure, abnormal sound, failure to operate, and the like).

Tests performed under these conditions using a conventional non-pivoting nut experienced failures at 1,400 telescopic cycles, with an operating motor current of 7-9 amps. Tests performed with a pivoting nut assembly in accordance with the teachings herein continued without failure for more than 40,000 telescopic cycles, with an operating motor current of 3.5-4 amps.

The present teachings also contemplate the method of translating a steering shaft of the steering column assembly in a fore or aft direction by advancing a tube (e.g., an inner tube) that supportingly carries the steering shaft. The method may include employing the pivoting nut assembly as described herein. The method may include causing a screw to rotate (e.g., by use of a motor or other actuator) and generate a force in a first direction. The first direction may be generally parallel to a longitudinal axis of the steering shaft. The force generated may cause a nut (e.g., of the pivoting nut assembly) linked with the tube that supportingly carries the steering shaft to advance substantially in the first direction. The method may also include inducing a pivotal motion and/or a radially outward motion in the pivoting nut assembly that creates a force state that allows the nut to retain a substantially constant orientation throughout fore and aft translation.

By way of summary (without limitation) of the general teachings herein, in a general respect, the present teachings relate to an adjustable steering column assembly. The assembly includes a steering shaft supported by other elements of the steering column assembly. For example, other elements may include an outer tube (e.g., a column housing), which may have one or more of the features as described in the present teachings. It may include an inner tube (e.g., a column tube) which may have one or more of the features as described in the present teachings and which may be adapted for telescopic adjustment within the column housing. It may simply be a tube or other suitable hollow structure (e.g., the single fabricated unit integrated structure referenced above) for receiving a steering shaft. A steering shaft, which may have one or more of the features as described in the present teachings (which may support a steering wheel that is attached to it in part and may optionally be a part of the assembly), may be supported for rotation (e.g., by one or more bearings), at least in part by the other elements of the steering column assembly (e.g., the column tube, the column housing, or both) and having a longitudinal axis. A steering column mounting structure, which may have one or more features as described in the present teachings, may be employed for at least partially carrying the steering shaft, column tube, column housing, or combination thereof, and attaching the assembly within a vehicle (e.g., to a cross-vehicle structure, instrument panel, or other elements of a vehicle capable of supporting the steering column assembly). As described, the steering column mounting structure may include a portion that provides one or more areas of attachment to the column housing (e.g., downwardly disposed side walls) for allowing tilt adjustment (e.g., by joining the column housing and the steering column mounting structure in a pivoting relationship).

While the present teachings are in the context of telescoping assemblies, if is also contemplated that the pivoting nut assembly as described herein can be adapted for use in tilt subassemblies. The pivoting nut assembly can be positioned on a tilt screw and can be used within the assembly for raising and lowering the steering wheel, steering shaft, inner tube, column housing, or a combination thereof.

Turning now to the figures, FIG. 1 illustrates an exemplary steering column assembly 10. The steering column assembly 10 includes a steering column mounting structure 12, which allows the steering column assembly to be mounted and secured within an automotive vehicle. The steering column mounting structure 12 supports an outer tube (illustrated herein as a column housing) 14. The column housing 14 at least partially receives an inner tube (e.g., a column tube) 16, which supports a steering shaft and a steering wheel (not shown). The steering column assembly 10 includes a tilt subassembly 20, which allows for selectively raising and/or lowering the steering shaft (e.g., so that the height position of the steering wheel relative to a vehicle operator can be adjusted). The steering column assembly 10 also includes a telescoping subassembly 30. The telescoping subassembly includes a motor that rotationally drives a telescope screw 34 about its longitudinal axis LA (see FIG. 3). A pivoting nut assembly 40 is adapted to move or translate along the telescope screw 34.

Figure 2:
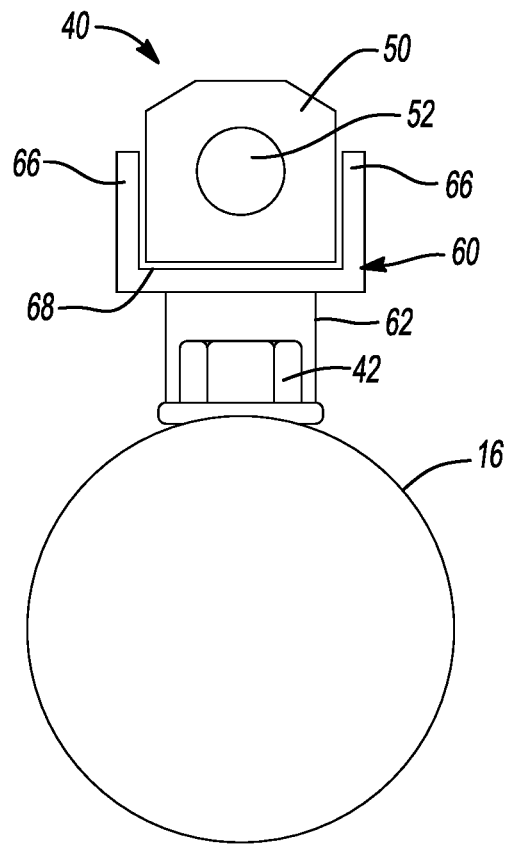
FIG. 2 is a cross-sectional view of a pivoting nut assembly in accordance with the present teachings.

FIG. 2 illustrates a cross-sectional view of a pivoting nut assembly 40 of the present teachings. The pivoting nut assembly 40 includes a nut 50 and a bracket 60. The nut 50 includes an opening 52 for receiving the telescoping screw 34 (not shown). The bracket 60 includes a base 62 having a bore 64 (see FIG. 4D) for receiving the head of a telescoping bolt 42 secured to and extending from the outer surface of the inner tube 16. The head of the telescoping bolt 42 is shown in the figure for exemplary and positional purposes, though when it is received within the bore 64, it may be entirely or partially obscured from view. The remainder of the telescoping bolt (e.g., the attachment of the bolt at the inner surface of the inner tube) has been omitted for clarity. The bracket 60 includes two generally opposing walls 68 extending from the base 62. The nut 50 is adapted to be received between the two opposing walls 66. A clearance 68 between the nut 50 and the bracket 60 provides sufficient space to allow the nut to pivot within the bracket. The nut 50 is secured to one or more walls 66 via arrangements as illustrated, for example, in FIGS. 4A and 5A-5D. The shape of the nut and/or the shape of the bracket are for exemplary purposes only and are not intended to serve as limiting shapes.

Figure 3:
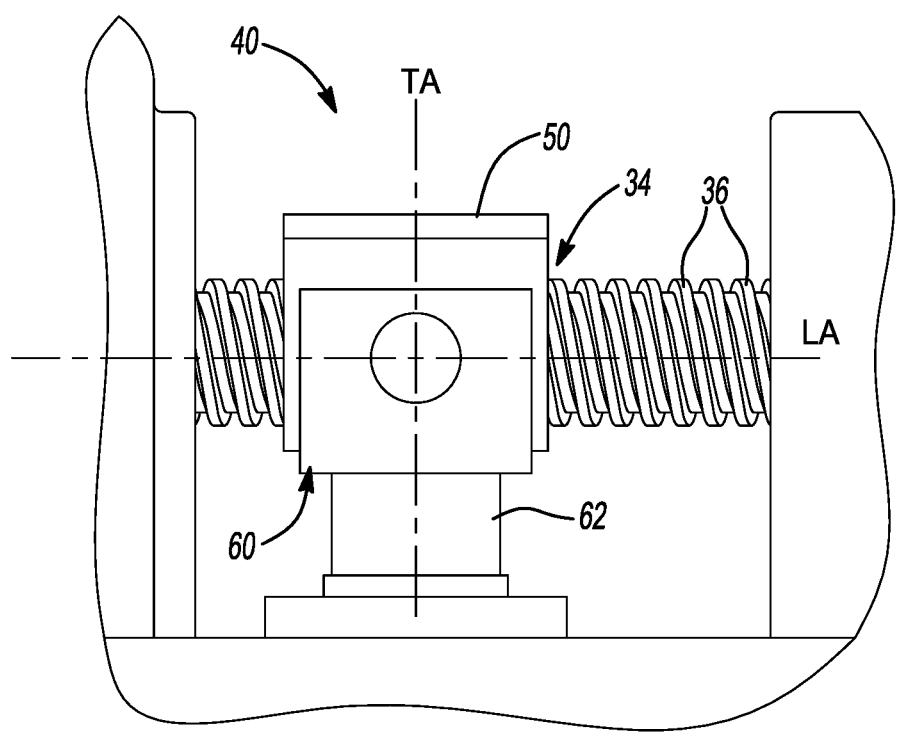
FIG. 3 is a side view of a pivoting nut assembly and a telescope screw in accordance with the present teachings.

FIG. 3 illustrates a side view of the pivoting nut assembly 40 within the steering column assembly. The nut 50 is adapted to travel along the telescope screw 34. The telescope screw 34 has threads 36, which engage with the internal threads 54 within the opening 52 of the nut 50 (see FIG. 4A, for example). The telescope screw 34 rotates about its longitudinal axis LA, which causes the nut 50 to move along the telescope screw. The nut is supported by and in pivoting relation with the bracket 60. The base 62 of the bracket 60 is in mating relation with the telescoping bolt extending from the inner or column tube (see FIG. 2). The bracket 60 is permitted to translate about a transverse axis TA, rotate about the transverse axis TA, or both.

FIGS. 4A, 4B, 4C, and 4D illustrate various views of a pivoting nut assembly 40, where FIG. 4A is a perspective view, FIG. 4B is a side view, FIG. 4C is a top view, and FIG. 4D is a bottom view of the pivoting nut assembly 40. The pivoting nut assembly 40 includes a nut 50 having an opening 52 for receiving a telescoping screw (not shown). The opening 52 includes internal threads 54 for engaging with the threads 36 of the telescope screw 34 (see FIG. 3).

The opening also includes a receptacle 56 for holding lubricant (though it is possible for the pivoting nut assembly to be free of this receptacle or for the receptacle to be located in another position within the nut (e.g., at the bottom of the opening). The nut 50 is joined to the bracket 60 by a pin 72 on each opposing wall 66 of the bracket. The bracket 60 includes a base 62 having a bore 64 for receiving the head of the telescoping bolt 42 (see FIG. 2). Attachment of the telescoping bolt to the inner tube may include using a spacer 44 to reduce the likelihood of loosening or rocking of the bolt on the inner tube or to provide additional cushioning for the bracket if the bracket translates along the transverse axis TA (see FIG. 3).

Figures 5A, 5B:
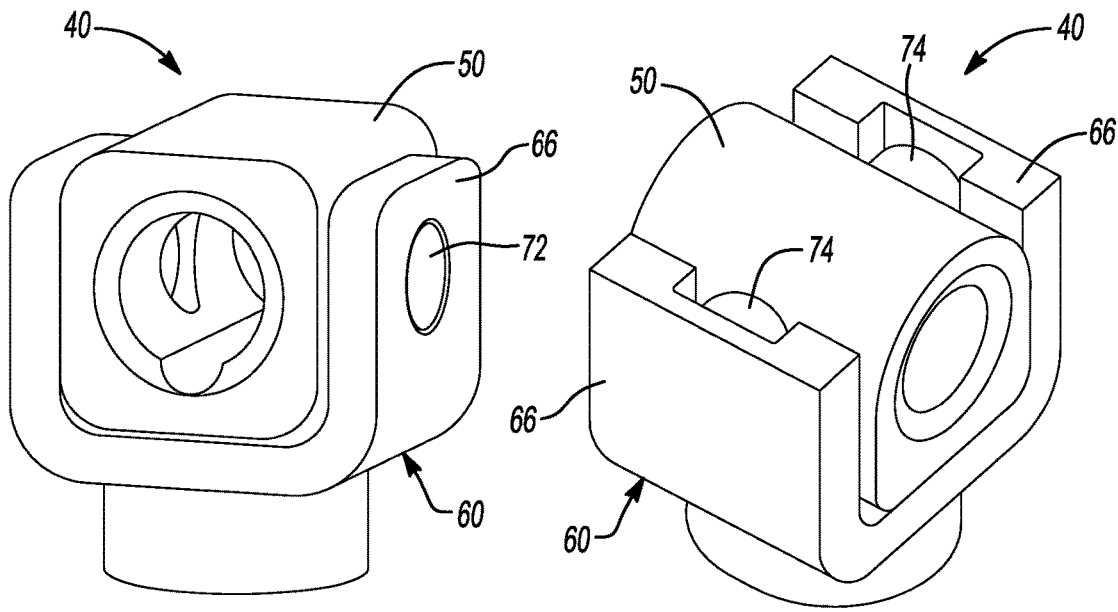
FIGS. 5A, 5B, 5C, and 5D are illustrative ways of pivotally securing the nut and bracket of the pivoting nut assembly.
Figures 5C, 5D:
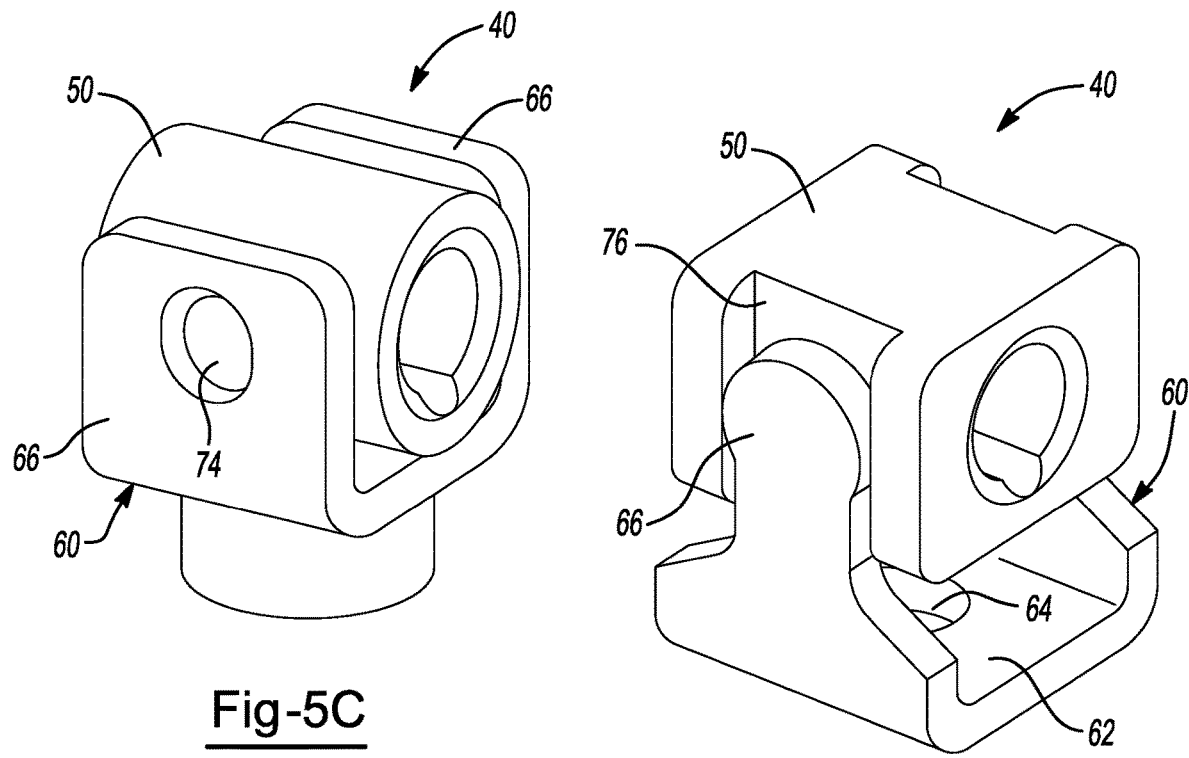

FIGS. 5A, 5B, 5C, and 5D are illustrative methods of joining the nut 50 and the bracket 60 in a pivoting nut assembly 40. FIG. 5A illustrates a pivoting nut assembly 40 where the nut 50 is joined to each opposing wall 66 of the bracket 60 by a pin 72 or other fastener. The bracket and the nut are free to move independently so the nut is permitted to rotate relative to the bracket and the bracket is permitted to translate along the transverse axis TA, rotate about the transverse axis TA (see FIG. 3), or both. FIGS. 5B and 5C illustrate a pivoting nut assembly 40 where the nut 50 includes a lateral projection 74 (e.g., a boss) to engage with each wall 66. The bracket and the nut are free to move independently. As the nut 50 of FIG. 5B is fit within a slot of the walls 66 in the bracket 60, the nut 50 is permitted to move up and down on the bracket, along the slot. The opening for receiving the lateral projection 74 of FIG. 5C (or any of the other figures) may be an elongated slot that allows the nut 50 to move upward and downward on the bracket (i.e., along the transverse axis TA of FIG. 3) as well as pivot relative to the bracket. FIG. 5D illustrates a pivoting nut assembly 40 where the nut 50 includes wells 76 to pivotally receive at least a portion of the walls 66 of the spacer extending from the base 62. The bore 64 of the base 62 may receive the telescoping bolt (not shown) or another fastener for securing the bracket to a tube of the assembly (e.g., the inner tube). The nut 50 is permitted to move up and down on the bracket within the wells 76 to permit movement of the nut along the transverse axis TA.

Figure 6:
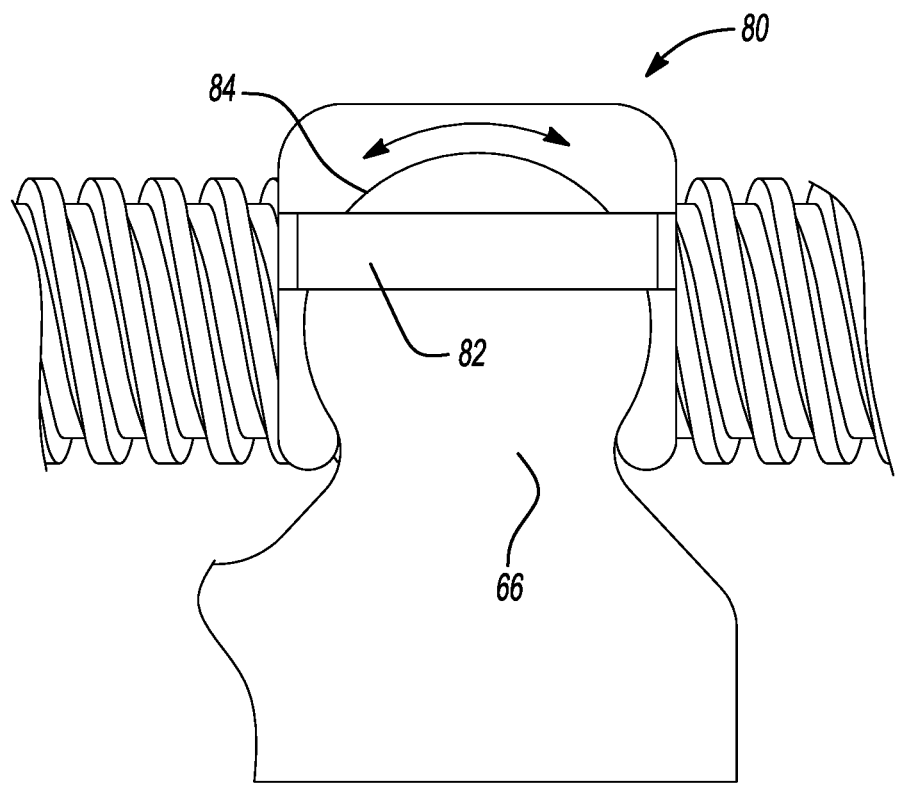
FIG. 6 is an illustrative way of employing a bushing secured to a wall of the bracket.
Figure 6A:
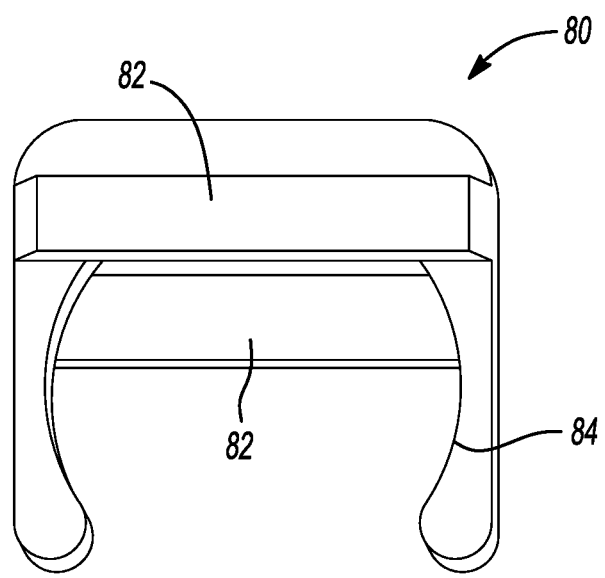
FIG. 6A is an exemplary bushing as used in FIG. 6.

FIG. 6 illustrates the addition of a bushing 80 to a wall 66 of the bracket for supporting a nut 50 (not shown). FIG. 6A illustrates a bushing 80. The bushing 80 is permitted to rest upon and rotate about the wall 66, which has a generally curved surface. The direction of rotation is illustrated by the arrows. The bushing 80 includes a pair of side walls 82 that are adapted to contact the wall 66 on opposing sides to secure the bushing on the wall and/or to prevent the bushing from rocking toward and away from the screw. The bushing 80 includes a contact portion 84 that is adapted to contact the wall 66. A nut (not shown) is adapted to receive the bushing, where the nut may be positioned over the bushing or positioned so that the bushing and nut are in contact with each other.

Figure 7:
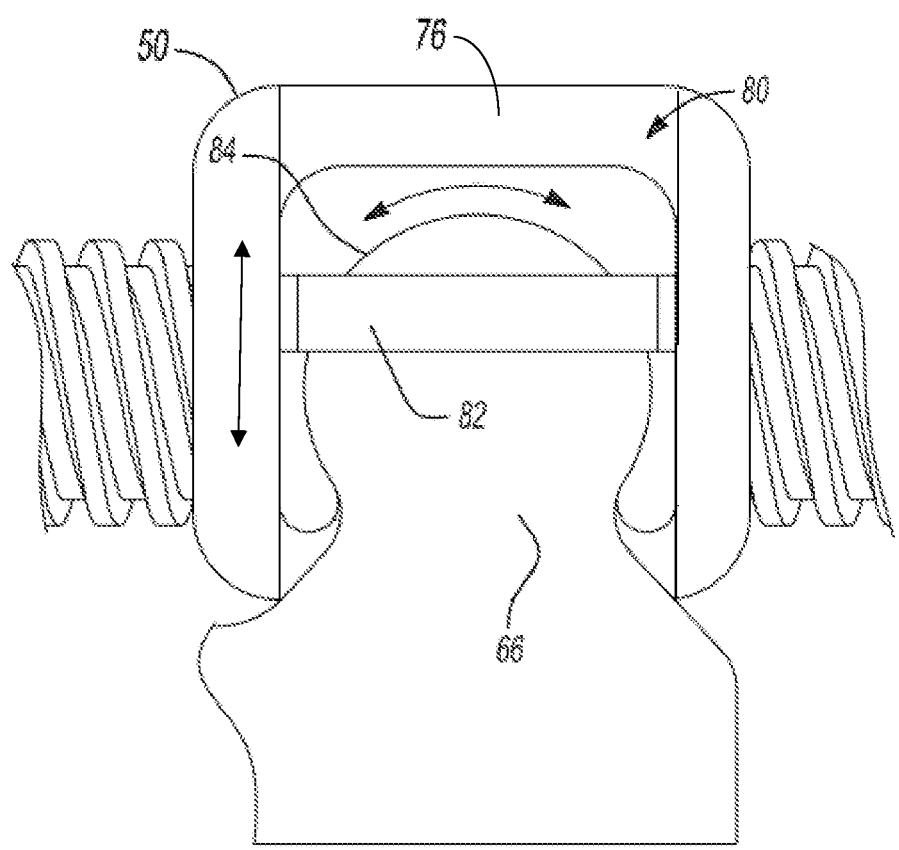
FIG. 7 is an illustrative way of employing a bushing secured to a wall of the bracket and a nut.

FIG. 7 illustrates an exemplary, but non-limiting, interaction of a bushing 80 with a nut 50. As described with respect to FIG. 6, the bushing 80 is permitted to rotate about the wall 66 via the contact portion 84 sliding along the wall 66. The side wall 82 secures the bushing 80 to the wall 66 and prevents the bushing 80 from rocking in a direction other than the rotational direction indicated by the curved double-sided arrow. The bushing 80 is received within a well 76 of the nut 50. The nut 50 and the bushing 80 are permitted to translate relative to each other (e.g., along an axis transverse to the longitudinal axis of the screw). The arrangement between the bushing 80 and the nut 50 eliminates line contact between the nut 50 and the wall 66 but allows for translations; and rotational movement between the nut and the wall 66 (which may be a plate stop).

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

As can be appreciated, variations in the above teachings may be employed. For example, it may be possible to employ manual adjustment of the steering column assembly (e.g., one or more levers or other user-actuated devices), instead of or in addition to one or more motors within the tilt subassembly and/or the telescoping subassembly. The assembly may include a manually operated steering wheel adjustment subassembly adapted for selectively adjusting the steering shaft in a fore or aft direction generally along the longitudinal axis, selectively raising or lowering the steering shaft, or both. The tilt and/or telescoping subassemblies may include a lever or other adapted for manually actuating the subassembly.

Any numerical values recited herein include all values from the lower value to the upper value in increments of one unit provided that there is a separation of at least 2 units between any lower value and any higher value. As an example, if it is stated that the amount of a component or a value of a process variable such as, for example, temperature, pressure, time and the like is, for example, from 1 to 90, preferably from 20 to 80, more preferably from 30 to 70, it is intended that values such as 15 to 85, 22 to 68, 43 to 51, 30 to 32 etc. are expressly enumerated in this specification. For values which are less than one, one unit is considered to be 0.0001, 0.001, 0.01 or 0.1 as appropriate. These are only examples of what is specifically intended and all possible combinations of numerical values between the lowest value and the highest value enumerated are to be considered to be expressly stated in this application in a similar manner.

Unless otherwise stated, all ranges include both endpoints and all numbers between the endpoints. The use of "about" or "approximately" in connection with a range applies to both ends of the range. Thus, "about 20 to 30" is intended to cover "about 20 to about 30", inclusive of at least the specified endpoints.

The disclosures of all articles and references, including patent applications and publications, are incorporated by reference for all purposes. The term "consisting essentially of" to describe a combination shall include the elements, ingredients, components or steps identified, and such other elements ingredients, components or steps that do not materially affect the basic and novel characteristics of the combination. The use of the terms "comprising" or "including" to describe combinations of elements, ingredients, components or steps herein also contemplates embodiments that consist essentially of, or even consisting of, the elements, ingredients, components or steps.

Plural elements, ingredients, components or steps can be provided by a single integrated element, ingredient, component or step. Alternatively, a single integrated element, ingredient, component or step might be divided into separate plural elements, ingredients, components or steps. The disclosure of "a" or "one" to describe an element, ingredient, component or step is not intended to foreclose additional elements, ingredients, components or steps.

Relative positional relationships of elements depicted in the drawings are part of the teachings herein, even if not verbally described. Further, geometries shown in the drawings (though not intended to be limiting) are also within the scope of the teachings, even if not verbally described.

What is claimed is:

1. A steering column assembly comprising:
   a) an outer tube having an inner diameter;
   b) an inner tube having an outer diameter that is smaller than the inner diameter of the outer tube;
   wherein the inner tube is adapted for fore and aft translation relative to the outer tube;
   c) an actuator for causing the fore and aft translation, the actuator including;
      i. a motor that is mounted in a fixed position relative to one of the outer tube or the inner tube;
      ii. a screw having a longitudinal axis and is rotationally driven about the longitudinal axis by the motor;
   d) a pivoting nut assembly that is adapted to travel fore and aft generally along an axis that is the same as or generally parallel with the longitudinal axis;
   wherein the pivoting nut assembly includes a bracket that is operably joined with the other of the inner tube or outer tube that is not fixed relative to the motor, for causing fore or aft translation of the inner tube in response to operation of the motor, and a nut that is assembled on the bracket and is adapted for pivotal movement in an axis generally transverse to the longitudinal axis;
   wherein the inner tube, the outer tube, or both, includes a radially projecting element projecting outwardly from its external surface; and
   wherein the radially projecting element is adapted for a mating relationship with the bracket of the pivoting nut assembly.

2. The steering column assembly of claim 1, wherein the bracket is fixed to the inner tube to prevent rotation and/or translation of the bracket along an axis located in a plane that is generally transverse to the longitudinal axis of the screw.

3. The steering column assembly of claim 1, wherein the radially projecting element is a telescoping bolt projecting outwardly from the external surface of the inner tube, the outer tube, or both.

4. The steering column assembly of claim 1, wherein the inner tube includes the radially projecting element projecting outwardly from its external surface.

5. The steering column assembly of claim 1, wherein the mating relationship allows the bracket to:
   a) translate about an axis located in a plane that is generally transverse to the longitudinal axis;
   b) rotate about an axis located in a plane that is generally transverse to the longitudinal axis; or
   c) both a) and b).

6. The steering column assembly of claim 1, wherein the bracket includes a base having a bore defined therein for matingly receiving the radially projecting element and at least one wall projecting outward from the base and configured to pivotally support the nut of the pivoting nut assembly.

7. The steering column assembly of claim 6, wherein the at least one wall projecting outward is a first wall and is part of a configuration having another spaced apart second wall that generally opposes the first wall.

8. The steering column assembly of claim 6, wherein the nut of the pivoting nut assembly is configured to have:
   a) one or more lateral projections that pivotally engage the at least one wall projecting outward;
   b) one or more wells adapted to pivotally receive a projecting member from the at least one wall projecting outward; or
   c) both a) and b).

9. The steering column assembly of claim 1, wherein a pivotal connection between the nut and the bracket is achieved by a male portion that at least partially penetrates a female portion, the male portion being an outward projection.

10. The steering column assembly of claim 1, wherein the nut and the bracket are assembled together in pivotal relation to impart a clearance between opposing surfaces of the bracket and the nut for affording the nut a degree of pivotal rotation when carried by the bracket.

11. The steering column assembly of claim 1, wherein the nut is threaded to threadingly co-act with the screw.

12. The steering column assembly of claim 1, wherein during operation of the steering column assembly for causing the fore or all translation of the inner tube, the screw exerts a first force generally along the longitudinal axis, the bracket exerts a second force generally opposite the first force, and the inner tube exerts a third force in a direction generally opposite the direction of the first force in a spaced generally parallel relationship, and wherein a sum of the second force and third force is an amount that is carried by the bracket generally to the exclusion of the nut.

13. The steering column of claim 1, wherein the pivoting nut assembly consists of no more than 4 separately formed components.

14. The steering column assembly of claim 13, wherein the pivoting nut assembly consists of no more than 2 separately formed components.

15. The steering column assembly of claim 1, wherein the nut and the bracket are in generally fixed relation to each other in a radial direction relative to the tube to which it is secured.

16. The steering column assembly of claim 1, wherein the bracket is free of any permanent attachment to the inner tube, outer tube, or both.

17. The steering column assembly of claim 1, wherein the pivoting nut assembly is free of a press fit between the bracket and the nut.

18. The steering column assembly of claim 1, wherein a bushing is located between the nut and a wall of the pivoting nut assembly to eliminate contact between the nut and the wall but allows for translational and rotational movement between the nut and the wall.

19. The steering column assembly of claim 1, wherein the pivoting nut assembly results in at least a 10x increase in cycle life as compared with a conventional non-pivoting nut design.

20. A steering column assembly comprising:
   a) an outer tube having an inner diameter;
   h) an inner tube having an outer diameter that is smaller than the inner diameter of the outer tube;
   wherein the inner tube is adapted for fore and aft translation relative to the outer tube;
   c) an actuator for causing the fore and aft translation, the actuator including:
      i. a motor that is mounted in a fixed position relative to one of the outer tube or the inner tube;
      ii. a screw having a longitudinal axis and is rotationally driven about the longitudinal axis by the motor;
   d) a pivoting nut assembly that is adapted to travel fore and aft generally along an axis that is the same as or generally parallel with the longitudinal axis;

wherein the pivoting nut assembly includes a bracket that is operably joined with the other of the inner tube or outer tube that is not fixed relative to the motor, for causing fore or aft translation of the inner tube in response to operation of the motor, and a nut that is assembled on the bracket and is adapted for pivotal movement in an axis generally transverse to the longitudinal axis;

wherein the inner tube, the outer tube, or both, includes a radially projecting element projecting outwardly from its external surface; and wherein the bracket includes a base having a bore defined therein for matingly receiving the radially projecting element and at least one wall projecting outward from the base and configured to pivotally support the nut of the pivoting nut assembly.

* * * * *